(12) United States Patent
Zenno

(10) Patent No.: US 7,881,847 B2
(45) Date of Patent: Feb. 1, 2011

(54) CLUTCH CONTROL DEVICE AND VEHICLE

(75) Inventor: Tooru Zenno, Shizuoka-ken (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 545 days.

(21) Appl. No.: 11/514,386

(22) Filed: Aug. 31, 2006

(65) Prior Publication Data

US 2007/0244617 A1 Oct. 18, 2007

(30) Foreign Application Priority Data

Apr. 18, 2006 (JP) .............................. 2006-114699

(51) Int. Cl.
*G06F 7/00* (2006.01)
(52) U.S. Cl. ........................... 701/67; 701/56; 477/166
(58) Field of Classification Search ..................... 701/1, 701/55, 56, 67, 68; 192/3.51, 3.55, 3.58, 192/20, 30; 477/166–181
See application file for complete search history.

(56) References Cited

U.S. PATENT DOCUMENTS

| | | | |
|---|---|---|---|
| 1,500,878 A | 7/1924 | Kruchten | |
| 5,121,649 A | 6/1992 | Randriazanamparany et al. | |
| 5,836,849 A * | 11/1998 | Mathiak et al. | 475/269 |
| H2031 H | 6/2002 | Harrell et al. | |
| 6,481,554 B1 | 11/2002 | Ota | |
| 6,502,681 B1 | 1/2003 | Ota | |
| 7,311,638 B2 * | 12/2007 | Kumazawa et al. | 477/177 |
| 7,356,400 B2 * | 4/2008 | Honma et al. | 701/67 |
| 7,470,214 B2 * | 12/2008 | Kumazawa | 477/166 |
| 2004/0118652 A1 | 6/2004 | Muetzel et al. | |
| 2004/0210374 A1* | 10/2004 | Werner et al. | 701/67 |
| 2005/0107215 A1* | 5/2005 | Werner et al. | 477/174 |
| 2006/0094567 A1 | 5/2006 | Kosugi et al. | |
| 2006/0124422 A1 | 6/2006 | Zenno | |
| 2006/0128525 A1 | 6/2006 | Zenno | |
| 2006/0128527 A1 | 6/2006 | Zenno et al. | |
| 2006/0160660 A1 | 7/2006 | Zenno et al. | |
| 2006/0169561 A1 | 8/2006 | Ooishi et al. | |
| 2006/0169562 A1 | 8/2006 | Kosugi | |
| 2006/0169569 A1 | 8/2006 | Ooishi et al. | |

FOREIGN PATENT DOCUMENTS

| | | |
|---|---|---|
| DE | 4336445 | 4/1995 |
| DE | 19709419 | 10/1997 |

(Continued)

OTHER PUBLICATIONS

European Search Report, Application No. EP06025734, Feb. 8, 2007.

(Continued)

*Primary Examiner*—Mark Hellner
*Assistant Examiner*—Helal A Algahaim
(74) *Attorney, Agent, or Firm*—Keating & Bennett, LLP

(57) ABSTRACT

An EEPROM of an ECU (engine control unit) stores regulation maps corresponding to a plurality of running modes (e.g., normal mode, swift mode and gentle mode). The regulation maps regulate the relationship between the clutch rotational speed difference and the target clutch position. When any one of the running modes is selected according to user intentions, the target clutch position is uniformly changed according to the running mode.

18 Claims, 14 Drawing Sheets

FOREIGN PATENT DOCUMENTS

| | | |
|---|---|---|
| DE | 19853333 | 6/1999 |
| DE | 10107962 | 8/2002 |
| DE | 10253809 A1 | 11/2002 |
| DE | 10327438 | 1/2004 |
| DE | 10304588 | 4/2004 |
| DE | 10306934 | 9/2004 |
| DE | 10393681 | 10/2005 |
| EP | 0129417 | 12/1984 |
| EP | 0328362 | 8/1989 |
| EP | 0 490 730 A1 | 12/1991 |
| EP | 0590240 | 4/1994 |
| EP | 0635391 | 7/1994 |
| EP | 0887220 | 6/1998 |
| EP | 0987467 | 7/1999 |
| EP | 1122116 | 1/2001 |
| EP | 1365176 | 5/2003 |
| EP | 1342930 A2 | 9/2003 |
| EP | 1555461 | 10/2003 |
| EP | 1469236 | 4/2004 |
| EP | 1666772 | 8/2005 |
| GB | 2170571 | 1/1986 |
| JP | 43-11555 | 5/1968 |
| JP | 68-152938 | 9/1983 |
| JP | 61-024858 | 2/1986 |
| JP | 62-017631 | 1/1987 |
| JP | 62-80192 | 4/1987 |
| JP | 62-75414 | 5/1987 |
| JP | 62-110532 | 5/1987 |
| JP | 02-118269 | 5/1990 |
| JP | 03-172675 | 7/1991 |
| JP | 03-290030 | 12/1991 |
| JP | 4-266619 | 9/1992 |
| JP | 05-026065 | 2/1993 |
| JP | 05-039865 | 2/1993 |
| JP | 60-86631 | 12/1994 |
| JP | 08-061487 | 3/1996 |
| JP | 11-082710 | 3/1999 |
| JP | 3044498 | 3/2000 |
| JP | 2000-205411 | 7/2000 |
| JP | 2001-050389 | 2/2001 |
| JP | 2001-146930 | 5/2001 |
| JP | 2001-173685 | 6/2001 |
| JP | 2001-280493 | 10/2001 |
| JP | 2002-067741 | 3/2002 |
| JP | 2002-243034 | 8/2002 |
| JP | 2003-329064 | 11/2003 |
| JP | 2005-282784 | 10/2005 |
| JP | 2006-017221 | 1/2006 |
| WO | WO 91/10979 | 7/1991 |
| WO | WO 98/24008 | 6/1998 |
| WO | WO 02/25131 | 3/2002 |
| WO | WO 2004/005743 | 1/2004 |
| WO | WO 2004/094177 | 11/2004 |

OTHER PUBLICATIONS

Co-Pending U.S. Appl. No. 11/514,387 filed Aug. 31, 2006. Title: Clutch Failure Detector, Automatic Clutch System, and Straddle-Type Vehicle.

Co-Pending U.S. Appl. No. 11/514,000 filed Aug. 31, 2006. Title: Automatic Shift Control Device and Vehicle.

Co-Pending U.S. Appl. No. 11/513,609 filed Aug. 31, 2006. Title: Automated Transmission Controller and Vehicle Including the Automated Transmission Controller.

Co-Pending U.S. Appl. No. 11/514,017 filed Aug. 31, 2006. Title: Automated Transmission Controller and Vehicle Including the Automated Transmission Controller.

Co-Pending U.S. Appl. No. 11/513,537 filed Aug. 31, 2006. Title: Automatic Gearshift Control Device and Vehicle.

Co-Pending U.S. Appl. No. 11/469,268 filed Aug. 31, 2006. Title: Clutch Actuator, Engine Unit, and Straddle Type Vehicle.

Co-Pending U.S. Appl. No. 11/469,310 filed Aug. 31, 2006. Title: Clutch Actuator, Engine Unit, and Straddle Type Vehicle.

Co-Pending U.S. Appl. No. 11/469,228 filed Aug. 31, 2006. Title: Clutch Actuator, Engine Unit, and Straddle Type Vehicle.

Co-Pending U.S. Appl. No. 11/469,252 filed Aug. 31, 2006. Title: Shift Actuator, Vehicle and Method of Integrating Vehicle.

Co-Pending U.S. Appl. No. 10/591,285 filed Aug. 31, 2006. Title: Riding Type Vehicle.

Co-Pending U.S. Appl. No. 10/591,560 filed Aug. 31, 2006. Title: Speed Change Controller for Straddle-Ride Type Vehicles.

Co-Pending U.S. Appl. No. 10/591,559 filed Aug. 31, 2006. Title: Shift Control Device for Straddle-Type Vehicle, and Straddle-Type Vehicle.

Co-Pending Appl. No. 10/591,284 filed Aug. 31, 2006. Title: Actuation Force Transmission Mechanism and Straddle-Type Vehicle.

EPO European Search Report for EP 06025982, completed Feb. 6, 2007.

EPO European Search Report for EP 06025981, completed Feb. 16, 2007.

EPO European Search Report for EP 06025877, completed Feb. 12, 2007.

EPO European Search Report for EP 06025732, completed Feb. 9, 2007.

EPO European Search Report for EP 06025609, completed Feb. 5, 2007.

EPO European Search Report for EP 06025607, completed Feb. 5, 2007.

EPO European Search Report for EP 06025606, completed Feb. 5, 2007.

* cited by examiner

| | Starting regulation map | Shift-up regulation map | | | | Shift-down regulation map | | | |
|---|---|---|---|---|---|---|---|---|---|
| | | Initial clutch position | 1st→2nd speed | 2nd→3rd speed | 3rd→4th speed / 4th→5th speed / 5th→6th speed | Initial clutch position | 2nd→1st speed | 3rd→2nd speed | 4th→3rd speed / 5th→4th speed / 6th→5th speed |
| Swift mode | 1a | 1b | 1c | 1d | 1e | 1f | 1g | 1h | 1i |
| Normal mode | 2a | 2b | 2c | 2d | 2e | 2f | 2g | 2h | 2i |
| Gentle mode | 3a | 3b | 3c | 3d | 3e | 3f | 3g | 3h | 3i |

CLUTCH CONTROL DEVICE AND VEHICLE

CROSS-REFERENCE TO RELATED APPLICATIONS

The present application is based on and claims priority under 35 U.S.C. §119 to Japanese Patent Application No. 2006-114699, filed on Apr. 18, 2006; the entire contents of which is expressly incorporated by reference herein.

BACKGROUND OF THE INVENTION

1. Field of the Invention

The present invention relates to a clutch control device for controlling an automatic clutch device, and to a vehicle incorporating the clutch control device.

2. Description of the Related Art

Prior vehicles have included an automatic clutch device for engaging and disengaging a friction clutch through an electric actuator. Such automatic clutch devices have often used a clutch position sensor for directly or indirectly detecting the position of the friction clutch (the distance between the friction plate and the clutch plate). For example, see Japanese Patent Publication No. JP-A-2002-067741.

For use in the vehicles including the clutch position sensor such as described above, the clutch can be operated using a drive control for the actuator which is based on a preset map according to the engine speed (e.g., when the vehicle starts to run). This technique allows for smooth shifting between gears.

The drive control of prior the automatic clutch devices usually is fixed at a setting where most drivers will feel comfortable. However, some drivers are particular about their vehicle's responsiveness when the vehicle starts to run or is at a shift change, and may dislike the fixed setting. For example, a user may dislike the operational feel of the vehicle when he or she does not obtain a response exactly as he or she desired, according to his or her operation of an accelerator.

SUMMARY OF THE INVENTION

An aspect of the present invention involves the recognition that only a slight change in the target clutch position causes a significant change in the response, even without making any change to the control methods associated with the throttle valves. One reason for this is that the clutch rotational speed difference can be converged more quickly than before when the target clutch position is set closer to the engagement side than is conventionally done. For example, at a gear change, the half-clutch period is shortened and vehicle response is improved. Also, at the time of vehicle start-up, the rotational speed of the driven side of the clutch increases more rapidly. As a result, the vehicle speed increases at a higher rate and the vehicle's response is improved. In this manner, changing the target clutch position closer to the engagement side can reduce the period for a half-clutch state, which can improve response. An aspect of the present invention thus utilizes a chain of operations with a clutch control device to adjust vehicle responsiveness easily by artificially changing the target clutch position.

Another aspect of the present invention involves a clutch control device that can make adjustable response at vehicle start-up or at a shift change, and that allows easy or suitable clutch connection in accordance with user intentions.

In accordance with an additional aspect of the invention, a clutch control device is provided for controlling an automatic clutch device having a friction clutch interposed between a driving-side power transmission mechanism and a driven-side power transmission mechanism. The automatic clutch device also includes an electric actuator for engaging and disengaging the friction clutch, either directly or indirectly. The clutch control device comprises a driving-side rotational speed detection device, a clutch position detection device, a storage device, a drive control unit, and a clutch position change device. The driving-side rotational speed detection device detects a driving-side rotational speed, which is a rotational speed of a driving part of the friction clutch or the driving-side power transmission mechanism, and the clutch position detection device detects a position of the friction clutch. The storage device stores a target position of the clutch set in association with the driving-side rotational speed. The drive control unit receives a detected value of the driving-side rotational speed from the driving-side rotational speed detection device to perform drive control of the friction clutch based on the target position of the clutch corresponding to the detected value stored in the storage device. The clutch position change device changes the target position according to human manipulation.

With the clutch control device described above, a person can suitably tailor the responsiveness and abruptness of the vehicle's transmission operation to the operator's desire by changing the position of the friction clutch relative to the drive speed at least during clutch engagement. For example, the target position can be adjusted so as to advance the connection of the friction clutch when swift starting operation is desired, while the target position is adjusted so as to delay the connection of the friction clutch, thereby providing response that coincides with user intentions.

BRIEF DESCRIPTION OF THE DRAWINGS

These and other features, aspects and advantages of the present invention will now be described in connection with preferred embodiments of the invention, in reference to the accompanying drawings. The illustrated embodiments, however, are merely examples and are not intended to limit the invention. The drawings include the following 14 figures.

FIG. 6 illustrations regulation maps stored in an EEPROM of the control system.

FIG. 7(a) shows clutch position relative to time, and FIG. 7(b) shows the rotational speed of the driving and driven sides of the clutch relative to time.

DETAILED DESCRIPTION OF THE PREFERRED EMBODIMENT

Description is hereinafter made of the embodiments of the present invention in detail with reference to the drawings.

Figure 1:
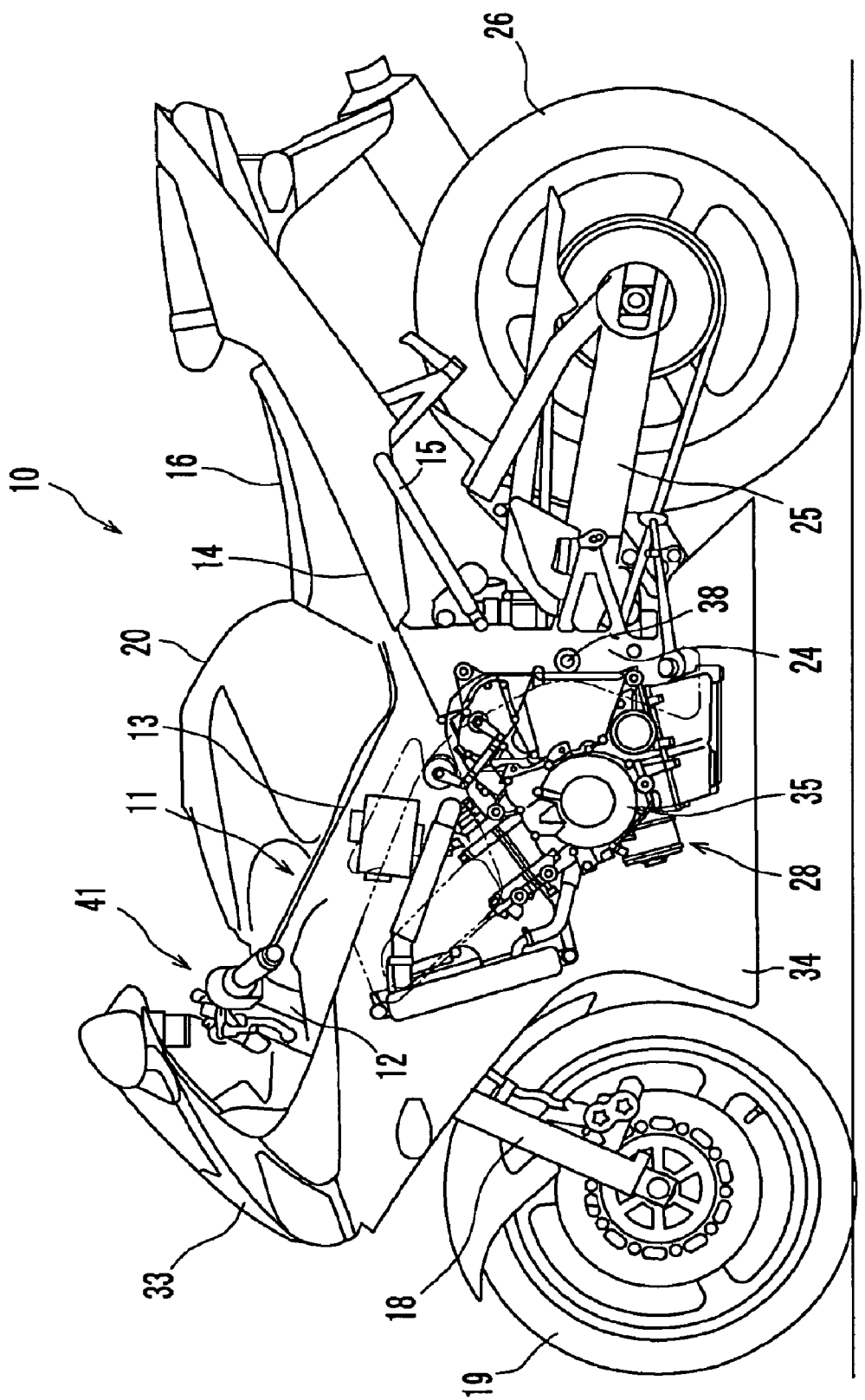
FIG. 1 is a side view of a two-wheeled vehicle including a clutch control device, which is configured in accordance with a preferred embodiment of the present invention.

As shown in FIG. 1, the straddle-type vehicle according to this embodiment is a two-wheeled motor vehicle 10. The two-wheeled motor vehicle 10 has a body frame 11 which forms the skeleton thereof and a seat 16 on which a rider can be seated. As the rider seated on the seat 16, he or she straddles the body frame 11. The present clutch control device, however, is not limited to use with this particular type of vehicle. That is, the type of vehicle on which the present control device can be employed is not limited to the shape of the vehicle shown in FIG. 1, and the maximum speed, displacement and size of the vehicle also not limited. The straddle-type vehicle according to the present invention is not limited to a so-called motorcycle type two-wheeled motor vehicle having a fuel tank in front of the seat, and may be a two-wheeled motor vehicle of a different type. Also, the straddle-type vehicle according to the present invention is not limited to a two-wheeled motor vehicle and may be a straddle-type vehicle of a different type (such as a marine vehicle or a four-wheeled vehicle, e.g., an ATV).

In the following description, front, rear, right and left refer to the directions as viewed from a rider seated on the seat 16. The body frame 11 has a steering head pipe 12, a main frame 13 extending rearward and obliquely downward from the steering head pipe 12, right and left seat rails 14 extending rearward and obliquely upward from an intermediate portion of the main frame 13, and right and left seat pillar tubes 15 each connected to the rear end of the main frame 13 and an intermediate portion of the corresponding seat rail 14.

A front wheel 19 is supported by the steering head pipe 12 via a front fork 18. A fuel tank 20 and the seat 16 are supported on the seat rails 14. The seat 16 extends from a position on the fuel tank 20 toward the rear ends of the seat rails 14. The fuel tank 20 is placed on the front halves of the seat rails 14.

A pair of right and left rear arm brackets 24 are provided at the rear end of the main frame 13. The rear arm brackets 24 and linked structure on the main frame 13 form a part of the body frame 11.

The rear arm brackets 24 protrude downward from the rear end of the main frame 13. The rear arm brackets 24 have a pivot shaft 38, and the front end of a rear arm 25 is swingably supported by the pivot shaft 38. A rear wheel 26 is supported at the rear end of the rear arm 25.

An engine unit 28 for driving the rear wheel 26 is also supported by the body frame 11. A crankcase 35 is suspended from and supported by the main frame 13. In this embodiment, the engine unit 28 has a gasoline engine (not shown). The engine of the engine unit 28 is not limited to an internal combustion engine, such as a gasoline engine, and may be an electric motor or the like. Also, the engine may be a combination of a gasoline engine and an electric motor.

The two-wheeled motor vehicle 10 has a front cowling 33 and right and left leg shields 34. The leg shields 34 are cover members for covering front parts of the rider's legs.

A brake pedal is provided at a lower right part of the two-wheeled motor vehicle 10 although not shown in FIG. 1. The brake pedal is used to stop the rear wheel 26. The front wheel 19 is stopped by operating a brake lever (not shown) provided in the vicinity of a right grip 41R (see FIG. 2) of handlebars 41.

Figure 2:
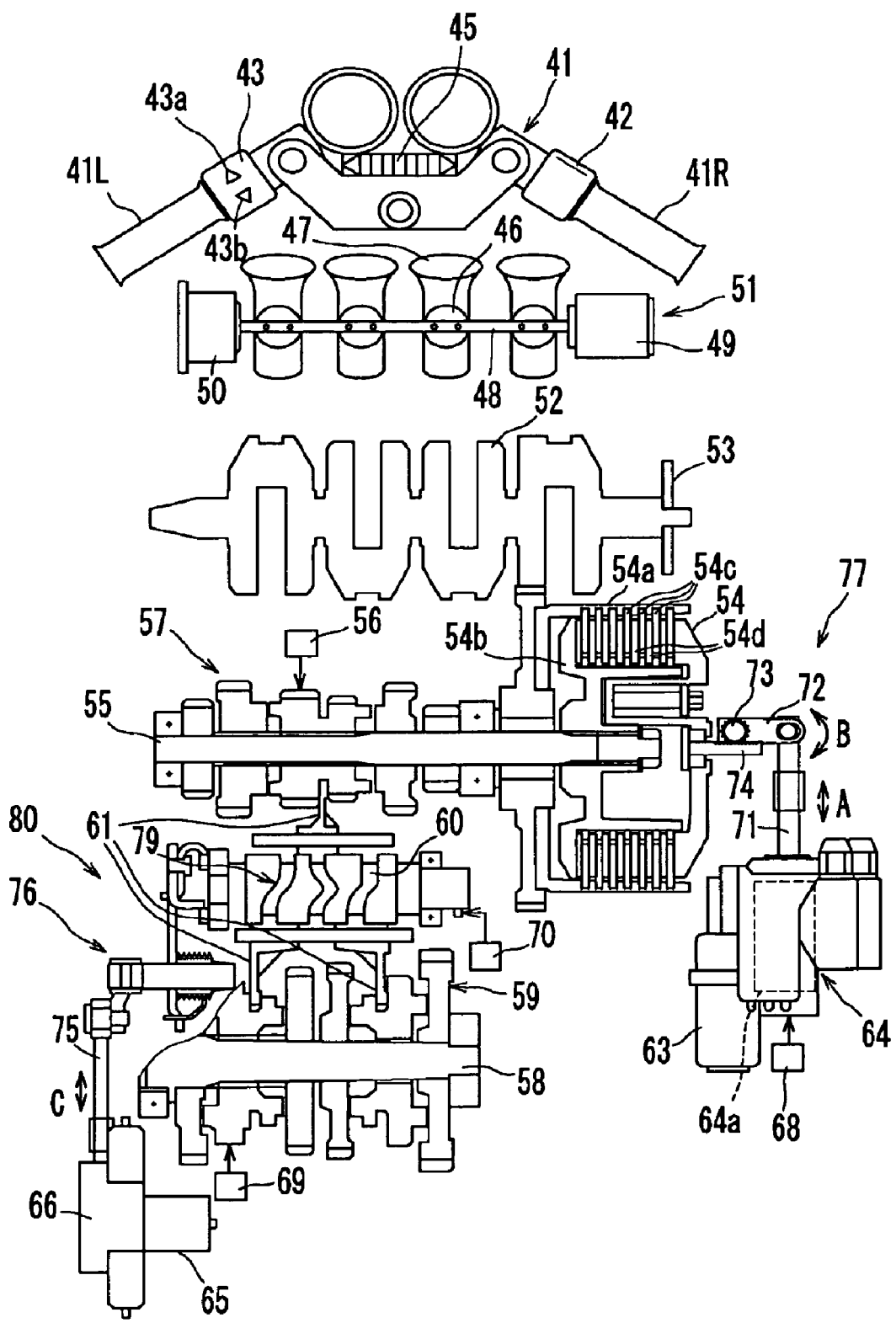
FIG. 2 is a schematic diagram of a driving system of the two-wheeled motor vehicle of FIG. 1.

FIG. 2 is a configuration diagram of a driving system of the two-wheeled motor vehicle shown in FIG. 1. The right grip 41R of the handlebars 41 (see also FIG. 1) constitutes an accelerator grip, and a throttle input sensor 42 is attached to the accelerator grip. The throttle input sensor 42 detects an accelerator input (throttle opening input) by the rider. A shift switch 43 is provided on the side of the left grip 41L on the handlebars 41. The shift switch 43 has a shift up switch 43a and a shift down switch 43b, and can change the shift position between neutral and top gear (sixth gear in this embodiment) by manual operation to increase or decrease the speed. Also, at the center of the handlebars 41, an indicator 45 for indicating at least the current shift position is provided. The indicator 45 in some embodiment can also display or indicate other vehicle operating information such as, for example, engine speed, vehicle speed, battery charge level, and the like.

Throttle valves 46 are attached to throttles 47 forming an air intake passage. A throttle driving actuator 49 is provided at the right end of a valve shaft 48 for the throttle valves 46, and a throttle opening sensor 50 is provided at the left end of the valve shaft 48. The throttle driving actuator 49 and the throttle opening sensor 50 attached to the valve shaft 48 constitute a DBW (drive-by-wire) 51. The DBW 51 opens or closes the throttles 47 with the throttle driving actuator 49 depending on the results of detection by the throttle opening sensor 50.

An engine rotational speed sensor 53 is provide at the right end of a crankshaft 52 connected to the engine (not shown). The crankshaft 52 is connected to a main shaft 55 via a wet multiple plate clutch 54.

The clutch 54 has a clutch housing 54a and a clutch boss 54b. A plurality of friction plates 54c are attached to the clutch housing 54a, and a plurality of clutch plates 54d are attached to the clutch boss 54b. Each of the clutch plates 54d is placed between adjacent friction plates 54c and 54c. However, the present clutch control device is not limited to a wet multiple plate clutch and can be used with other types of clutches such as, for example, but without limitation, a dry clutch or a single plate clutch.

In the illustrated embodiment, a plurality (six in FIG. 2) of shift gears 57 are mounted on the main shaft 55, and a main shaft rotational speed sensor 56 is attached to the main shaft 55. The shift gears 57 mounted on the main shaft 55 are in meshing engagement with shift gears 59 mounted on a drive shaft 58 disposed parallel to the main shaft 55. In FIG. 2, the shift gears 57 and the shift gears 59 are separated for convenience of explanation.

Both or either the shift gears 57 and/or the shift gears 59 are mounted on the main shaft 55 or the drive shaft 58 in such a manner as to idle relative thereto except for selected gears. Therefore, transmission of driving force from the main shaft 55 to the drive shaft 58 is made only through a pair of selected shift gears.

The operation to select a shift gear 57 and a shift gear 59 for a gear change is carried out by a shift cam 79. The shift cam 79 has a plurality of (three in FIG. 2) cam grooves 60, and a shift fork 61 is received in each cam groove 60. Each shift fork 61 is engaged with specific shift gears 57 and 59 on the main shaft 55 and the drive shaft 58. When the shift cam 79 rotates, the shift forks 61 move axially along the cam grooves 60, and a pair of shift gears 57 and 59 at a position corresponding to the rotational angle of the shift cam 79 are spline-engaged with the main shaft 55 and the drive shaft 58. The spline-engaged pair of speed gears 57 and 59 transmits driving force from the main shaft 55 to the drive shaft 58. The shift gears 57 and 59, and the shift cam 79 constitute a gearbox 80.

The clutch 54 and the gearbox 80 described above are driven by a clutch actuator 63 and a shift actuator 65, respectively.

The clutch actuator 63 is connected to the clutch 54 via a hydraulic pressure transmitting mechanism 64, a rod 71, a lever 72, a pinion 73 and a rack 74. The hydraulic pressure transmitting mechanism 64 is a mechanism which includes a hydraulic cylinder 64a and an oil tank (not shown), and which is driven by the clutch actuator 63 to generate hydraulic pressure and transmits the hydraulic pressure to the rod 71. When the rod 71 is driven by the clutch actuator 63 to reciprocate as indicated by the arrow A, the lever 72 rotates as indicated by the arrow B, whereby the clutch 54 is engaged or disengaged depending on the moving direction of the rack 74.

An automatic clutch device 77 preferably is comprised of the clutch 54, the clutch actuator 63, the hydraulic pressure transmitting mechanism 64, the rod 71, the lever 72, the pinion 73, the rack 74, and an ECU 100 (see FIG. 3) for drive control of the clutch actuator 63. Although an electric motor is employed as the clutch actuator 63 in this embodiment, the present clutch control device is not limited use with an electric motor. For example, a solenoid or an electromagnetic valve may be used.

The shift actuator 65 is connected to the shift cam 79 via a reduction mechanism 66, a rod 75 and a link mechanism 76. The reduction mechanism 66 has a plurality of reduction gears (not shown). At the time of a gear change, the rod 75 is driven by the shift actuator 65 to reciprocate as indicated by the arrow C, and the shift cam 79 is rotated by a specific angle via the link mechanism 76. The shift forks 61 thereby move axially a specific distance along the cam grooves 60, and a pair of shift gears 57 and 59 is fixed to the main shaft 55 and the drive shaft 58, respectively. Then, driving force is transmitted from the main shaft 55 to the drive shaft 58. Although an electric motor is employed as the shift actuator 65 in this embodiment, the present invention is not limited thereto. For example, a solenoid or an electromagnetic valve may be used.

The hydraulic pressure transmitting mechanism 64 connected to the clutch actuator 63 has a clutch position sensor 68 which detects the stroke position of the piston to detect the clutch position (the distance between the friction plates 54c and the clutch plates 54d). Although the clutch position sensor 68 detects the stroke position of the piston to detect the clutch position in this embodiment, the present invention is not limited thereto. The position of a transmitting mechanism disposed between the clutch actuator 63 and the clutch 54 may be detected. For example, the position of the rod 71 or the rack 74 may be detected. The clutch position is not necessarily obtained indirectly from a detected stroke position of the piston as in this embodiment. The distance between the friction plates 54c and the clutch plates 54d may be directly measured with a sensor.

Also, a vehicle speed sensor 69 is provided on the drive shaft 58. In addition, a gear position sensor 70 for detecting the gear position (the amount of rotation of the shift cam) is provided on the shift cam 79.

A shift change is carried out when an ECU 100 (engine control unit), which is described later, performs drive control of the clutch actuator 63 and the shift actuator 65 in response to an operation of the shift up switch 43a or the shift down switch 43b. More specifically, a series of operations are performed based on a specific program or map involving: (1) disengaging the clutch 54 by the clutch actuator 63; (2) changing the shift gears 57 and 59 by the shift actuator 65; and (3) engaging the clutch 54 by the clutch actuator 63.

Figure 3:
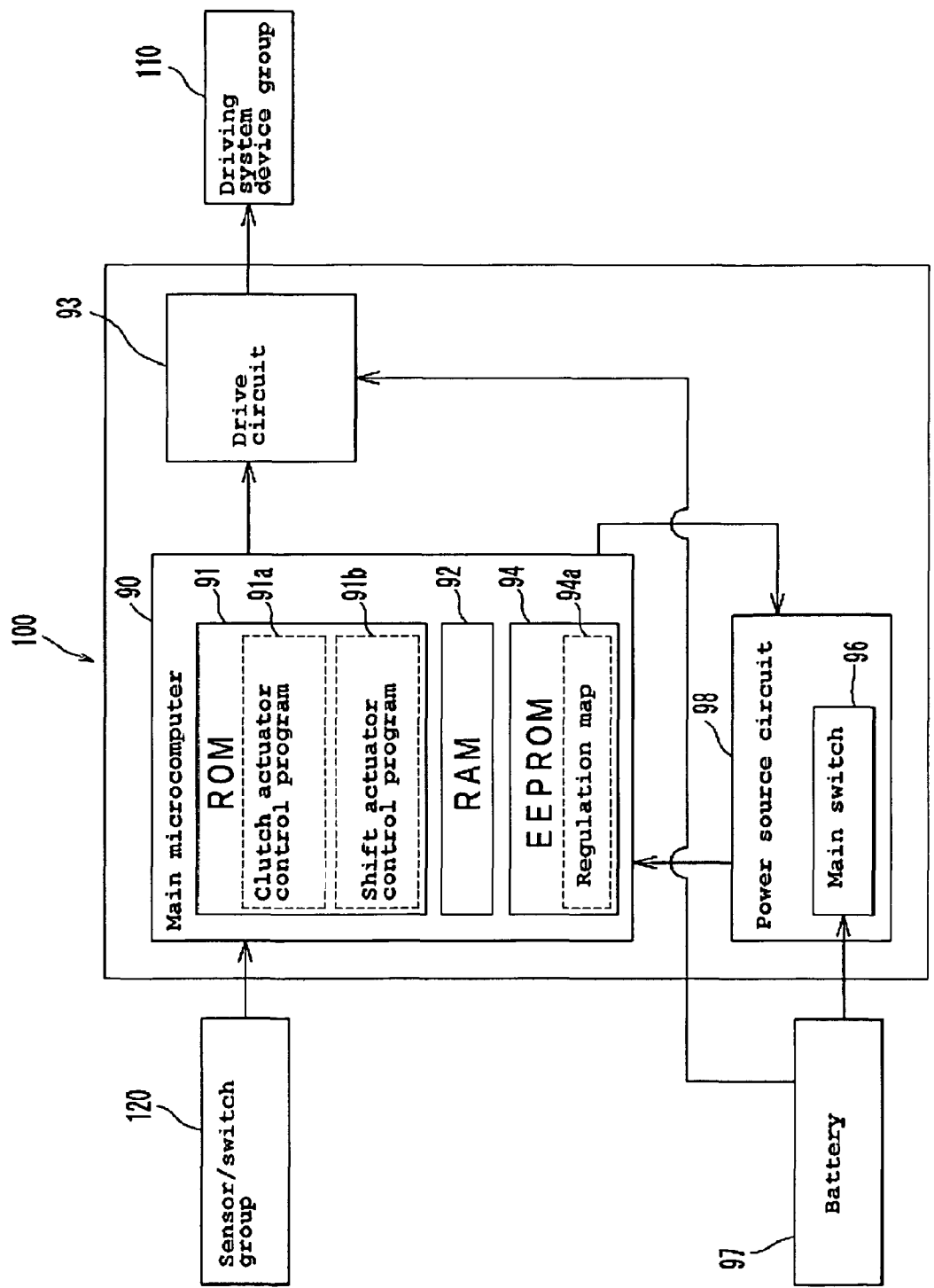
FIG. 3 is a block diagram illustrating the entire configuration of a control system mounted on the two-wheeled motor vehicle of FIG. 1.
Figure 4:
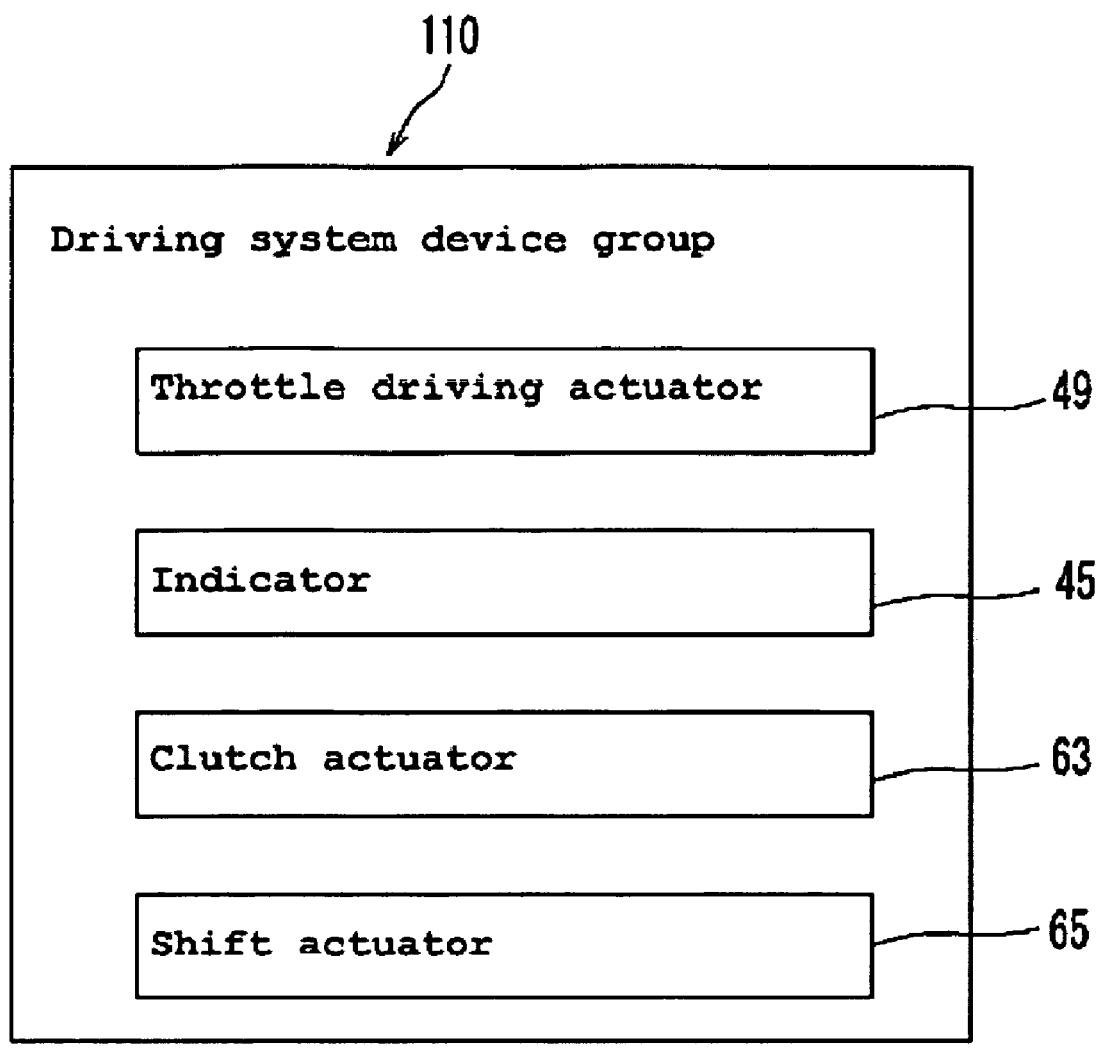
FIG. 4 is a block diagram illustrating a driving system device group.

FIG. 3 is a block diagram illustrating the entire configuration of a control system mounted on the two-wheeled motor vehicle 10. A driving system device group 110 is connected to a main microcomputer 90 of ECU 100 via a drive circuit 93. The driving system device group 110 comprises the throttle driving actuator 49, the indicator 45, the clutch actuator 63 and the shift actuator 65 (see also FIG. 2) as shown in FIG. 4.

Figure 5:
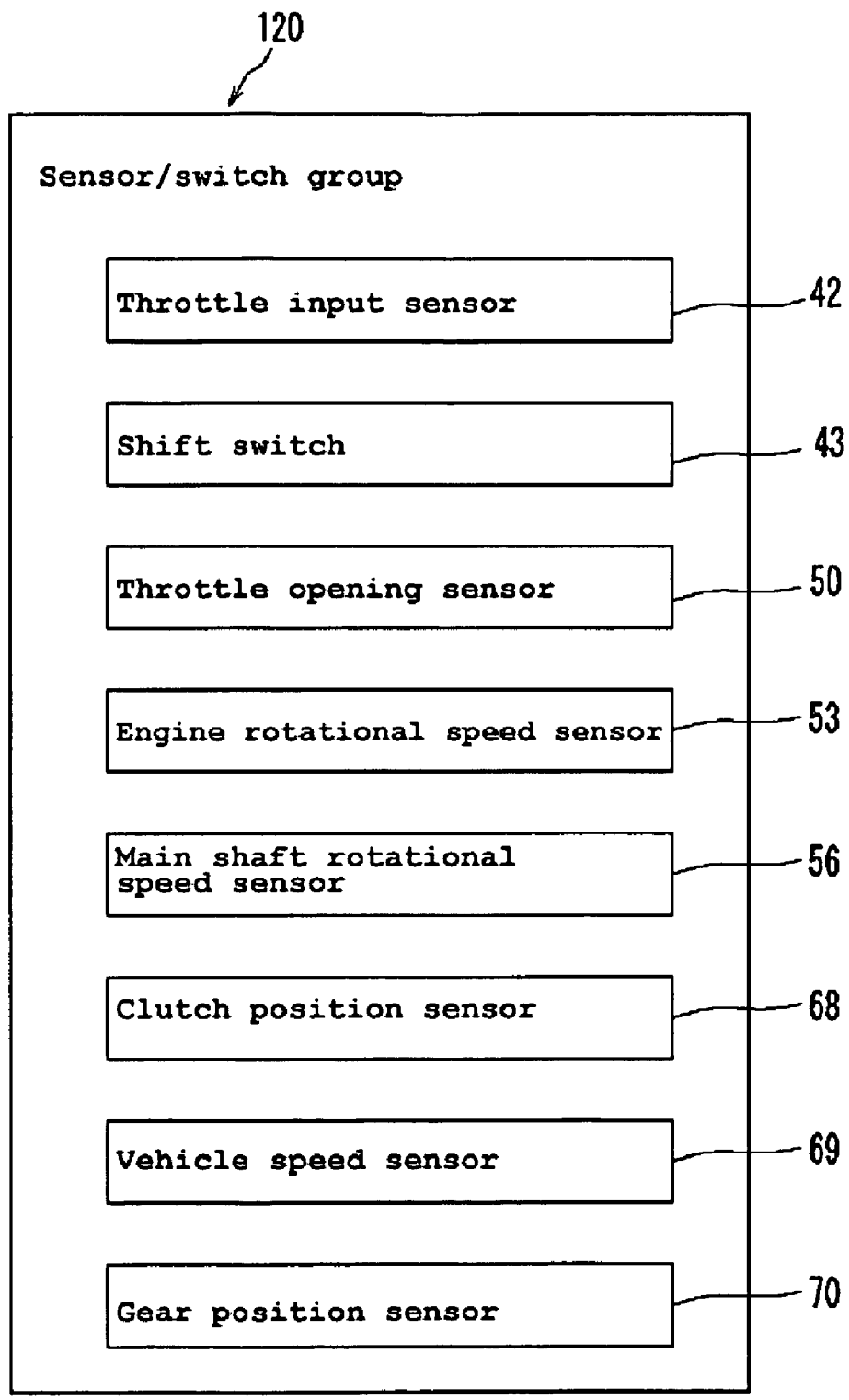
FIG. 5 is a block diagram illustrating a sensor/switch group.

The drive circuit 93 supplies appropriate currents to the devices forming the driving system device group 110 from a battery 97 in response to a drive signal fed from the main microcomputer 90. A sensor/switch group 120 is also connected to the main microcomputer 90. The sensor/switch group comprises the throttle input sensor 42, the shift switch 43, the throttle opening sensor 50, the engine rotational speed sensor 53, the main shaft rotational speed sensor 56, the clutch position sensor 68, the vehicle speed sensor 69 and the gear position sensor 70 as shown in FIG. 5 (see also FIG. 2), and the results of detections by the sensors are inputted into the main microcomputer 90. The main microcomputer 90 feeds drive signals to the devices forming the driving system device group 110 based on the results of detections received from the sensors to perform drive control of them.

In the illustrated embodiment, the engine rotational speed sensor 53 functions as a driving-side rotational speed detection device for detecting the rotational speed of the driving side of the friction clutch (the driving part of the friction clutch or a driving-side power transmission mechanism), which produces a driving-side rotational speed signal. The clutch position sensor 68 functions as a clutch position detection device for detecting the clutch position. The main shaft rotational speed sensor 56 functions as a driven-side rotational detection device for detecting the rotational speed of the driven side of the friction clutch (i.e., driven-side rotational speed).

The main microcomputer 90 has a ROM 91, a RAM 92 and an EEPROM 94. A clutch actuator control program 91a and a shift actuator control program 91b are stored in the ROM 91. The clutch actuator control program 91a is a program for drive control of the clutch actuator 63 with reference to a regulation map 94a which is described later. The shift actuator control program 91b is a program for drive control of the shift actuator 65. The programs stored in the ROM 91 preferably cannot be deleted, and a new program and data preferably cannot be written into the ROM 91.

When the clutch actuator control program 91a or the shift actuator control program 91b is executed, the program is expanded on the RAM 92 and then read into the main microcomputer 90. Then, the main microcomputer 90 performs drive control of the clutch actuator 63 or the shift actuator 65 based on the program expanded on the RAM 92.

The EEPROM 94 is a rewriteable and erasable data storage medium. The EEPROM 94 stores a regulation map 94a which regulates the target position where the clutch is to be positioned (target clutch position). As will later be described using FIG. 6, plural types of regulation maps 94a are stored for various running conditions (at vehicle start-up, at a shift up, at a shift down) of the two-wheeled motor vehicle 10. The main microcomputer 90 performs drive control of the clutch actuator 63 with reference to the results of detection by the clutch position sensor 68 based on the clutch actuator control program 91a and a regulation map selected from the plural types of regulation maps 94a. The EEPROM 94 is an example of a map storage device. Also, in this embodiment, the ECU 100 incorporating the main microcomputer 90 is an example of a drive control unit.

A power source circuit 98 connected to the battery 97 has a main switch 96 which is switched on or off in synchronization with manual control (e.g., with a key switch (not shown)). When the main switch 96 is switched on, the power source circuit 98 converts the voltage from the battery 97 into a voltage for driving the main microcomputer 90 and supplies it to the main microcomputer 90.

FIG. 6 shows the regulation maps 94a stored in the EEPROM 94 shown in FIG. 3. In the two-wheeled motor vehicle 10 according to the embodiment, one running mode can be selected from a plurality of running modes. In the illustrated embodiment, one running mode can be selected from three running modes (swift mode, normal mode and gentle mode) according to a specific operation. The number of running mode provided, however, can be fewer or greater than three. For example, as described later, the number of modes can be almost infinite in number where the modes are defined by compensation or adjustment values that are used to deviate from the target position for the clutch ("the target clutch position").

The selection of the running mode is made by human manipulation after assembly of the vehicle. The human manipulation may be made in any of a variety of ways, such as, for example, but without limitation, using one or more switches or toggles that may have a dedicated function or may have multiple purposes. For instance, the human manipulation may be made by a mechanic or the like who operates a switch(es) or the like provided inside the vehicle body. The switch(es) may be installed at a specific position on the handlebars 41, for example, so that the rider of the two-wheeled motor vehicle 10 can select the running mode. An existing switch(es) such as the shift switch 43 may be used also as the switch for this purpose. Additionally, the operator, owner or technician can select the running mode using a remote device that communicates (either via a cable or through a transponder/receiver connection) with the clutch control device.

In each running mode of the two-wheeled motor vehicle 10 according to the embodiment, a regulation map in accordance with the running condition is selected, and drive control of the clutch actuator 63 is performed based on the selected regulation map. For example, in the normal mode, a starting regulation map 2a is selected at vehicle start-up, shift-up regulation maps 2b-2e are selected at a shift up, and shift-down regulation maps 2f-2i are selected at a shift down.

In this embodiment, different shift-up regulation maps are used before and after a specific clutch position (which is hereinafter referred to as "initial clutch position") between the engaged state and the disengaged state of the clutch 54. The driving behavior of the clutch actuator 63 from the disengaged state to the initial clutch position of the clutch 54 is regulated by one of the regulation maps 1b, 2b and 3b that correspond to the selected mode. The driving behavior of the clutch actuator 63 after the initial clutch position is regulated by one of the sets of regulation maps 1c to 1e, 2c to 2e and 3c to 3e, which correspond to the selected mode. After the initial clutch position, different regulation maps are selected depending on the shift position for the shift up.

Also, in this embodiment, different shift-down regulation maps are used before and after the initial clutch position, similar to the use of the shift-up regulation maps described above. The driving behavior of the clutch 63 from the disengaged state to the initial clutch position of the clutch 54 is regulated by one of the regulation maps 1f, 2f and 3f that corresponds to the selected mode. The driving behavior of the clutch 63 after the initial clutch position is regulated by one of the sets of regulation maps 1g to 1i, 2g to 2i and 3g to 3i, which correspond to the selected mode. After the initial clutch position, different regulation maps are selected depending on the shift position for the shift down.

Figure 7:
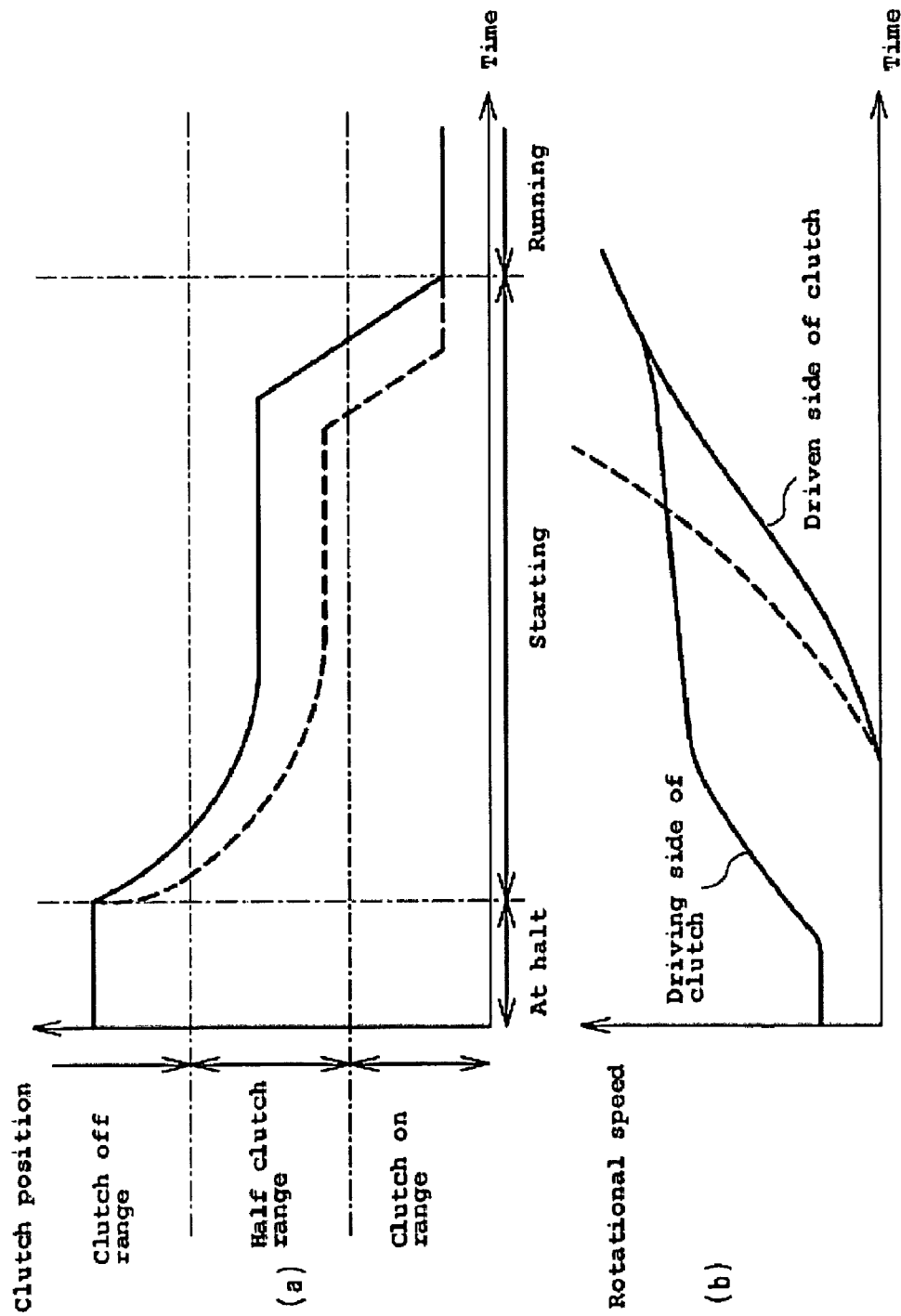
FIGS. 7(a) and 7(b) are graphs showing the transition of the state of the two-wheeled motor vehicle at vehicle start-up.

FIG. 7 shows the transition of the state of the two-wheeled motor vehicle 10 at vehicle start-up. FIG. 7(a) shows the transition of the target clutch position over time, from the beginning to the end of the starting-to-run. FIG. 7(b) shows the transition of the rotational speeds of the driving side and the driven side of the clutch 54 over time, from the beginning to the end of the starting-to-run. The rotational speed of the driving side of the clutch 54 can be measured by the engine rotational speed sensor 53. The rotational speed of the driven side of the clutch 54 can be measured by the main shaft rotational speed sensor 56.

As shown in FIG. 7(a), when the two-wheeled motor vehicle 10 starts to run, the clutch 54 is gradually engaged from the disengaged state and reaches the engaged state through a half-clutch state based on the starting regulation map. Also, as shown in FIG. 7(b), the rotational speed of the driven side of the clutch gradually approximates that of the driving side of the clutch during the engagement process of the clutch 54, and the rotational speeds of the driven and driving sides are equal to each other in the engaged state of the clutch 54. In FIGS. 7(a) and 7(b), the solid lines correspond to the case where the normal mode is selected, and the broken lines correspond to the case where the swift mode is selected. The broken line of FIG. 7(b) denotes the rotational speed of the driven side of the clutch in the swift mode. Here, in order to facilitate understanding of the improvement in the response at different target clutch positions, the rotational speed of the driving side of the clutch is controlled to be generally the same in either mode. That is, in the swift mode, the throttle opening is controlled to be slightly larger so that the rotational speed of the driving side of the clutch changes in the same way as in the normal mode. However, it should be noted that the swift mode can be practiced without such control of the throttle opening.

In FIG. 7, as described above, the solid lines indicate the transition over time in the case where the normal mode is selected, while the broken lines indicate the transition over time in the case where the swift mode is selected. As shown in FIG. 7, the period for clutch engagement in the swift mode is shorter than that in the normal mode. Also, the period until the rotational speeds of the driving side and the driven side of the clutch 54 become equal to each other in the swift mode is shorter than that in the normal mode. Thus, the swift mode allows swift starting operation in response to an accelerator operation compared to the normal mode.

In this embodiment, the transition of the clutch position over time at vehicle start-up can be changed by selecting any one of the three running modes (swift mode, normal mode and gentle mode).

Figure 8:
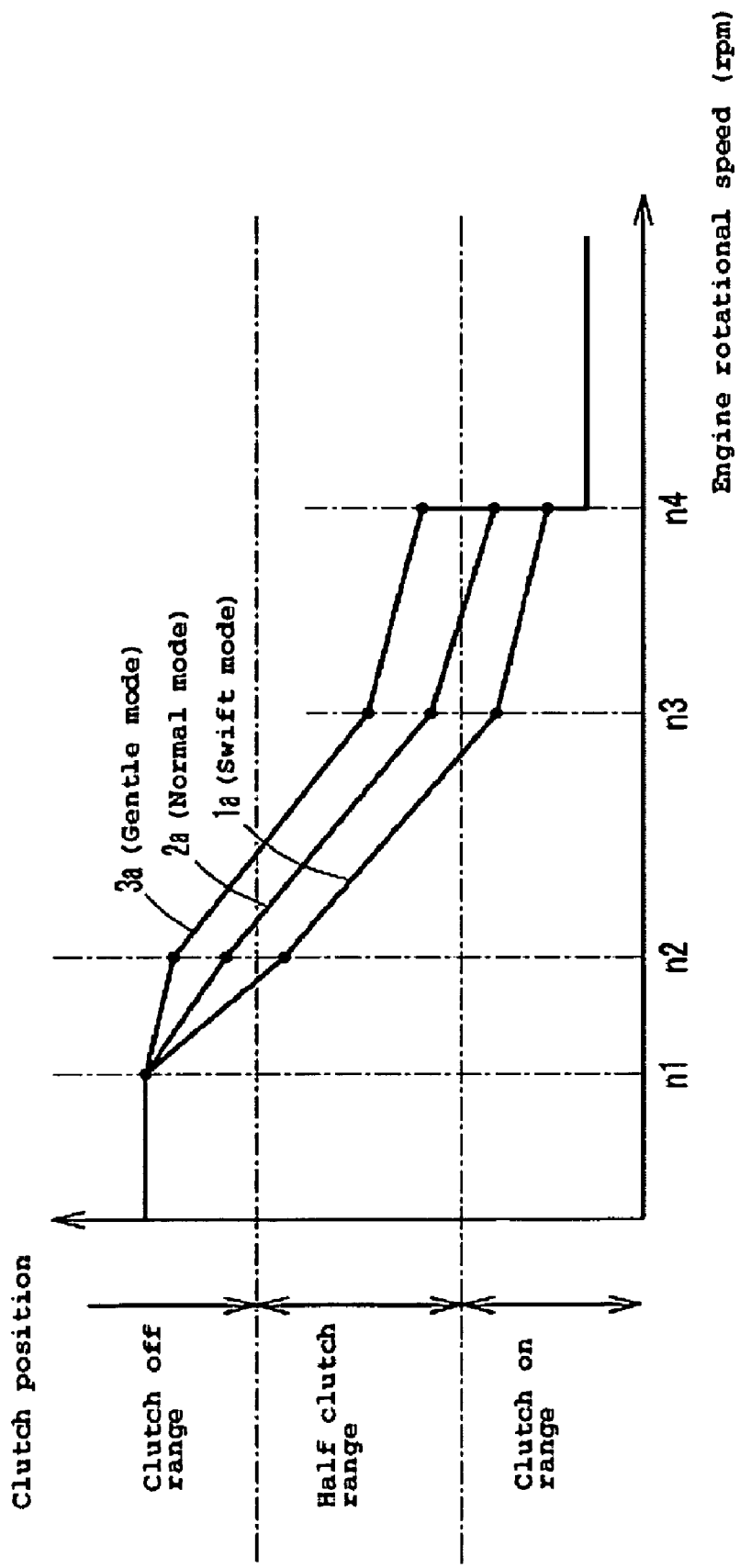
FIG. 8 shows starting regulation maps for respective running modes.

FIG. 8 shows the starting regulation maps for the respective running modes. The starting regulation maps 1a, 2a and 3a each define the relationship between the engine rotational speed and the target clutch position. The ECU 100 performs drive control of the clutch actuator 63 based on the starting regulation map corresponding to the selected running mode. That is, the ECU 100 performs drive control of the clutch actuator 63 such that the target clutch positions indicated by the selected starting regulation map are achieved at respective engine rotational speeds n1 to n4.

As shown in FIG. 8, the target clutch positions at the engine rotational speeds n2 to n4 indicated by the starting regulation map 1a for the swift mode are deviated (advanced) to the clutch engaged side (lower side of FIG. 8) with respect to those indicated by the starting regulation map 2a for the normal mode. With these characteristics, the swift mode allows swifter starting operation in response to an accelerator operation compared to the normal mode. Also, the target clutch positions at the engine rotational speeds n2 to n4 indicated by the starting regulation map 3*a* for the gentle mode are deviated (retarded) to the clutch disengaged side (upper side of FIG. 8) with respect to those indicated by the starting regulation map 2*a* for the normal mode. With these characteristics, the gentle mode allows gentler starting operation in response to an accelerator operation compared to the normal mode.

Figure 9:
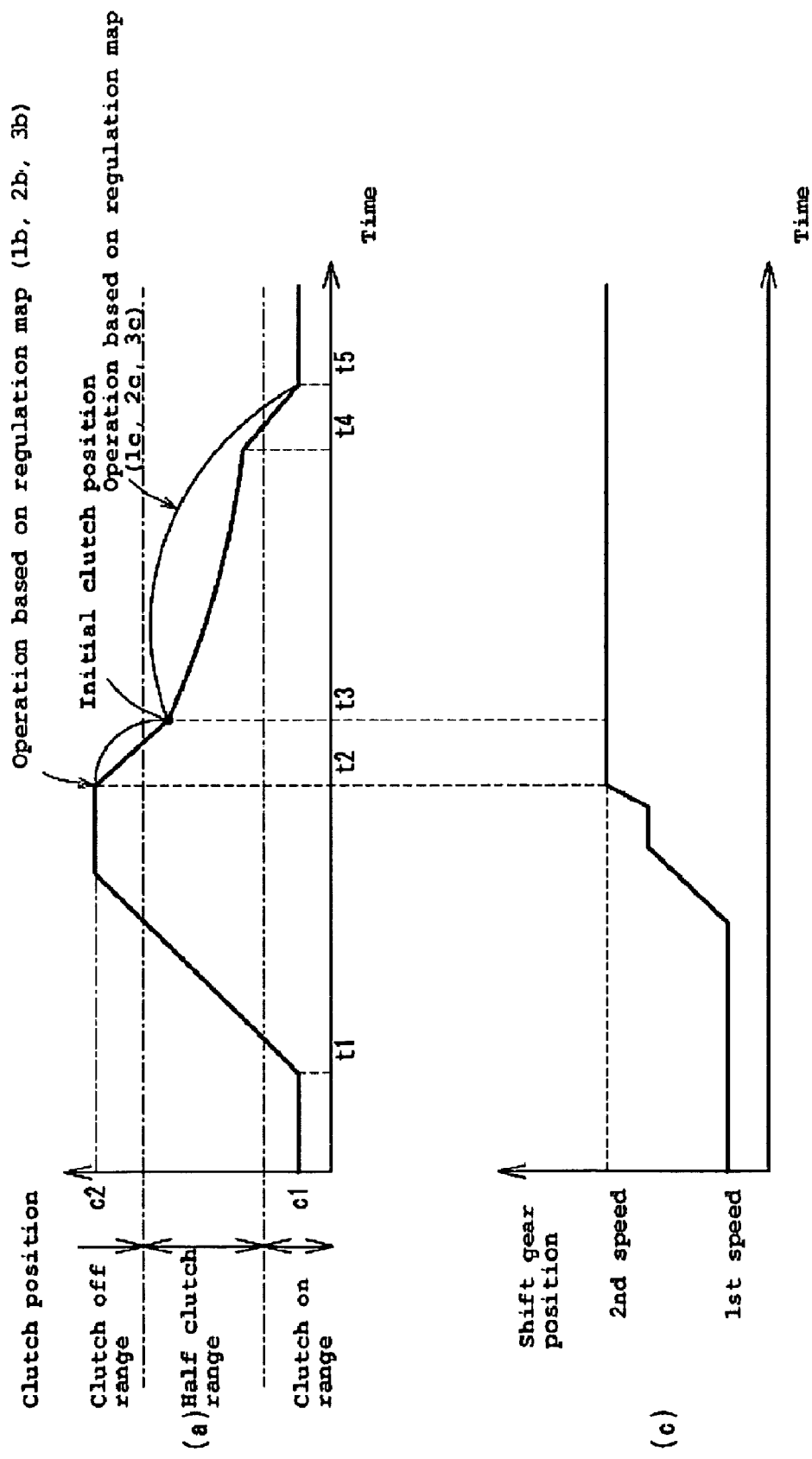
FIGS. 9(a) and 9(b) show the transition of the state of the two-wheeled motor vehicle at a shift up.

FIG. 9 shows the transition of the state of the two-wheeled motor vehicle 10 at a shift up. FIG. 9 shows the case of a shift up from the 1st gear to the 2nd gear. FIG. 9(*a*) shows the transition of the clutch position over time, from the beginning to the end of the shift up. FIG. 9(*b*) shows the transition of the shift gear position over time, from the start to the end of the shift up. The shift gear position can be detected by the gear position sensor 70.

As shown in FIGS. 9(*a*) and 9(*b*), at a shift up of the two-wheeled motor vehicle 10, the clutch 54 is disengaged from the engaged state at a constant rate to carry out a gear change (in FIG. 9, from the 1st gear to the 2nd gear). After the gear change is carried out, the clutch 54 is gradually engaged and reaches the engaged state through a half-clutch state based on the selected shift-up regulation maps (that is, selected set of the regulation maps 1*b* to 1*e*, 2*b* to 2*e* or 3*b* to 3*e*). In this embodiment, the transition of the clutch position over time during a clutch engagement process at a shift up can be changed by selecting any one of the three running modes.

In this embodiment, the selected shift-up regulation map (1*b*, 2*b* or 3*b*) is used for drive control of the clutch actuator 63 during the period from the clutch off state to the initial clutch position shown in FIG. 9 (the period from t2 to t3), and the selected shift-up regulation map (1*c*, 2*c* or 3*c*) is used for drive control of the clutch actuator 63 during the period from the initial clutch position to the clutch on state (the period from t3 to t5).

Figure 10:
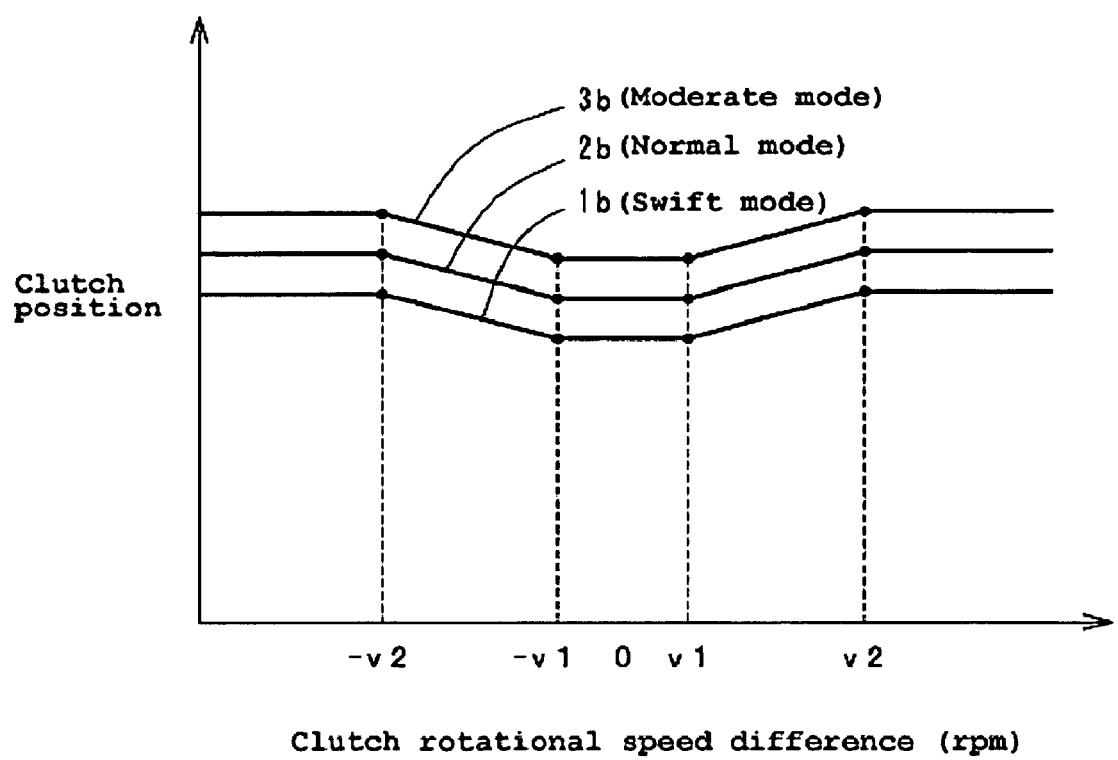
FIG. 10 shows shift-up regulation maps for the respective running modes.

FIG. 10 shows the shift-up regulation maps for the respective running modes, used during the period from the clutch off state to the initial clutch position. The shift-up regulation maps 1*b*, 2*b* and 3*b* each define the relationship between the clutch rotational speed difference and the target clutch position. The clutch rotational speed difference is the difference between the rotational speeds of the clutch housing 54*a* and the clutch boss 54*b*, and equal to the difference between the rotational speed of the crankshaft 52 (see FIG. 2) (engine rotational speed) and the rotational speed of the main shaft 55. The clutch rotational speed difference can be calculated using the engine rotational speed sensor 53 and the main shaft rotational speed sensor 56.

The ECU 100 performs drive control of the clutch actuator 63 based on the shift-up regulation map corresponding to the selected running mode. That is, the ECU 100 performs drive control of the clutch actuator 63 such that the target clutch positions indicated by the selected shift-up regulation map are achieved at respective clutch rotational speed differences (−v2, −v1, 0, v1 and v2).

As shown in FIG. 10, the target clutch positions at the clutch rotational speed differences (−v2, −v1, 0, v1 and v2) indicated by the shift-up regulation map 1*b* for the swift mode are deviated (advanced) to the clutch engaged side (lower side of FIG. 10) with respect to those indicated by the shift-up regulation map 2*b* for the normal mode. With these characteristics, the swift mode allows swifter shift up operation in response to an operation of the shift up switch 43*a* (see FIG. 2). Also, the target clutch positions at the respective clutch rotational speed differences indicated by the shift-up regulation map 3*b* for the gentle mode are deviated (retarded) to the clutch disengaged side (upper side of FIG. 10) with respect to those indicated by the shift-up regulation map 2*b* for the normal mode. With these characteristics, the gentle mode allows gentler shift up operation in response to an operation of the shift up switch 43*a* compared to the normal mode.

Figure 11:
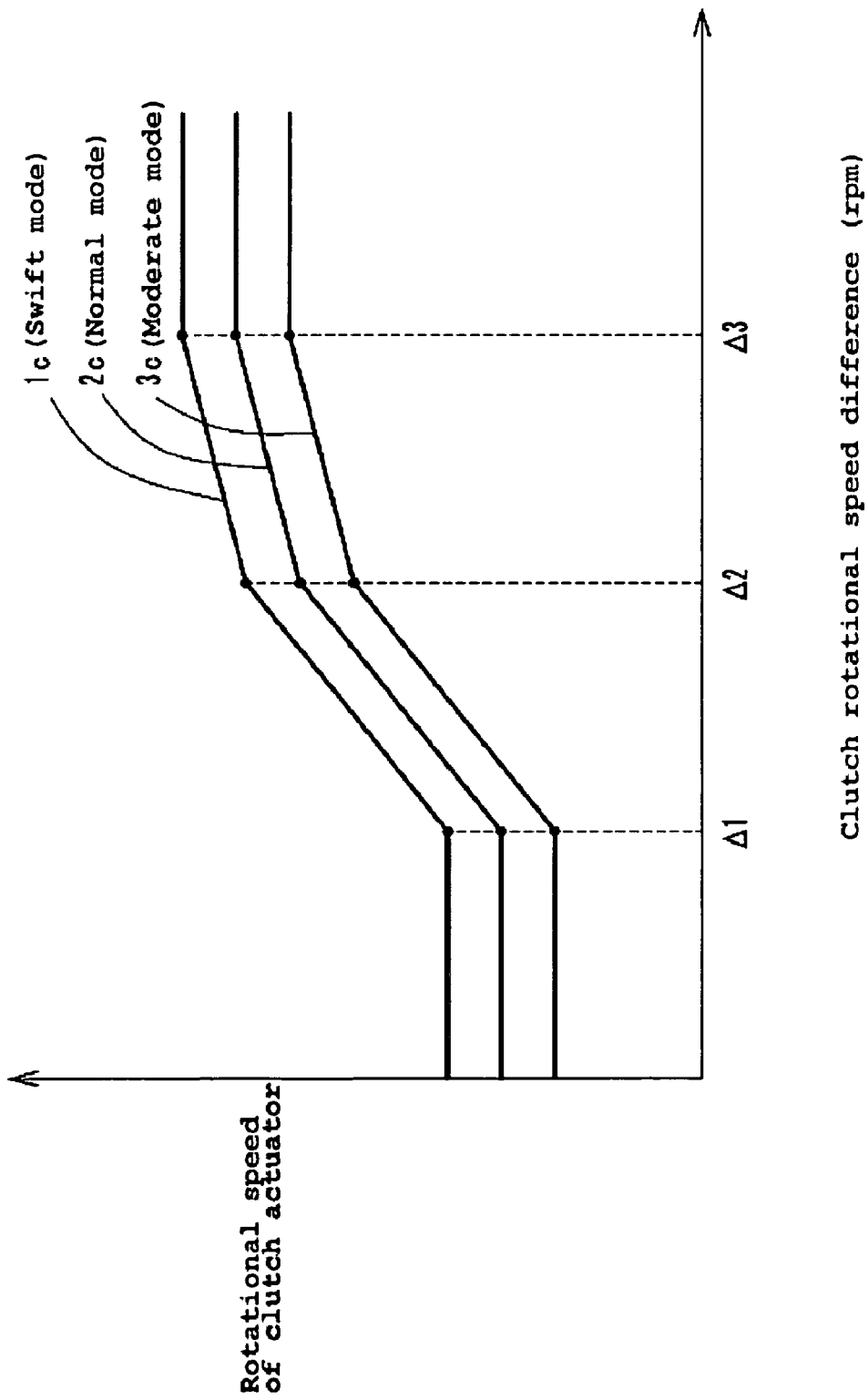
FIG. 11 shows shift-up regulation maps for the respective running modes.

FIG. 11 shows the shift-up regulation maps for the respective running modes, used during the period from the initial clutch position to the clutch on state. The shift-up regulation maps in the drawing are those for use at a shift up from the 1st gear to the 2nd gear. The shift-up regulation maps 1*c*, 2*c* and 3*c* each define the relationship between the clutch rotational speed difference and the rotational speed of the clutch actuator 63. The ECU 100 performs drive control of the clutch actuator 63 based on the shift-up regulation map corresponding to the selected running mode. That is, the ECU 100 performs drive control of the clutch actuator 63 such that the rotational speeds indicated by the selected shift-up regulation map are achieved at respective clutch rotational speed differences (Δ1, Δ2 and Δ3). When the rotational speed of the clutch actuator 63 is determined, the target clutch position is uniquely determined.

As shown in FIG. 11, the rotational speeds of the clutch actuator 63 at the respective clutch rotational speed differences (Δ1, Δ2 and Δ3) indicated by the shift-up regulation map 1*c* for the swift mode are faster than those indicated by the shift-up regulation map 2*c* for the normal mode. With these characteristics, the swift mode allows swifter shift up operation compared to the normal mode. Also, the rotational speeds of the clutch actuator 63 at the respective clutch rotational speed differences indicated by the shift-up regulation map 3*c* for the gentle mode are slower than those indicated by the shift-up regulation map 2*c* for the normal mode. With these characteristics, the gentle mode allows gentler shift up operation compared to the normal mode.

Figure 12:
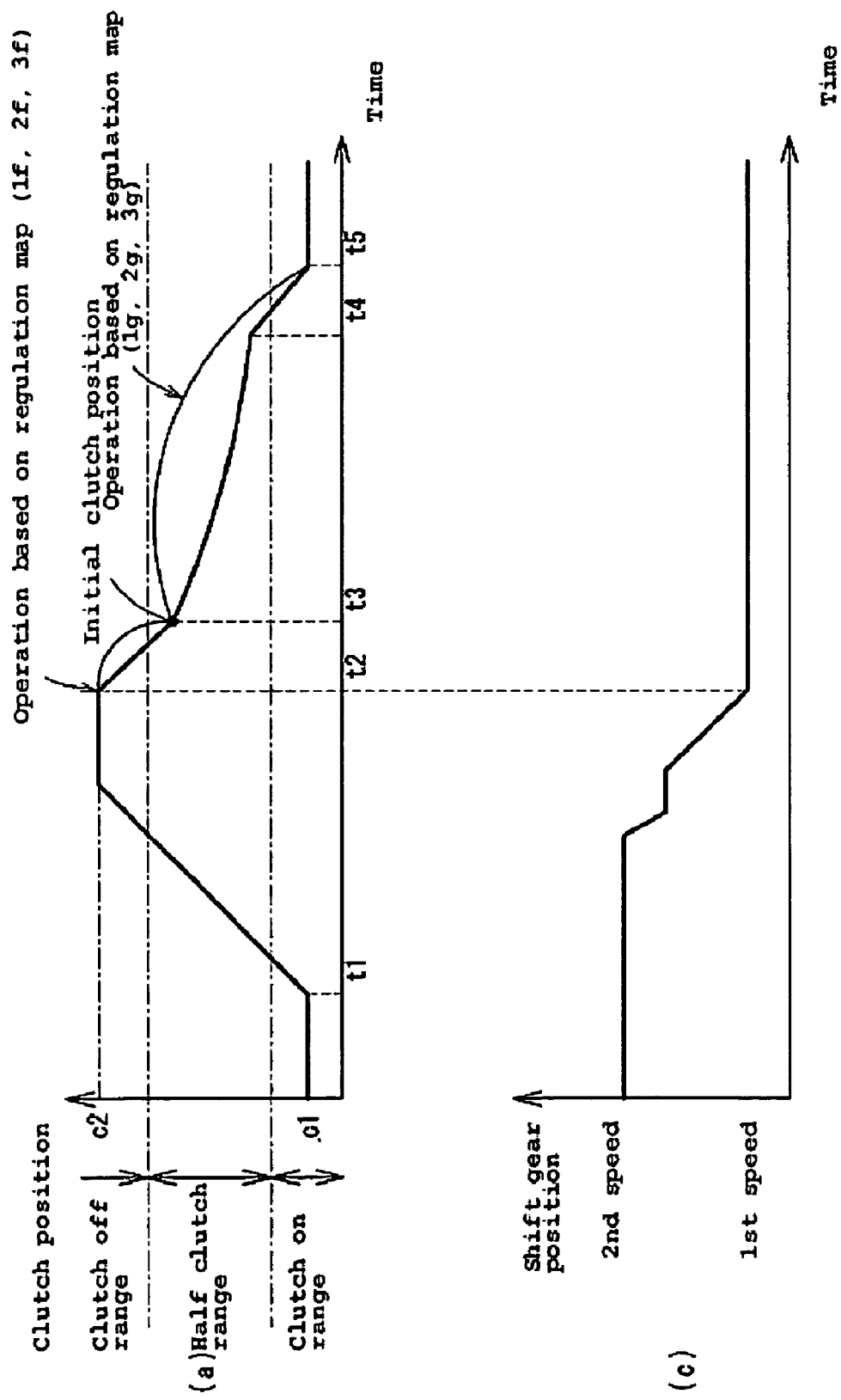
FIGS. 12(a) and 12(b) show the transition of the state of the two-wheeled motor vehicle at a shift down.

FIG. 12 shows the transition of the state of the two-wheeled motor vehicle 10 at a shift down. FIG. 12 shows the case of a shift down from the 2nd gear to the 1st gear. FIG. 12(*a*) shows the transition of the clutch position over time, from the beginning to the end of the shift down. FIG. 12(*b*) shows the transition of the shift gear position over time, from the start to the end of the shift down.

As shown in FIGS. 12(*a*) and 12(*b*), at a shift down of the two-wheeled motor vehicle 10, the clutch 54 is disengaged from the engaged state at a constant rate to carry out a gear change (in FIG. 12, from the 2nd gear to the 1st gear). After the gear change is carried out, the clutch 54 is gradually engaged and reaches the engaged state through a half-clutch state based on the selected shift-down regulation maps (that is, the selected set of regulation maps 1*f* to 1*i*, 2*f* to 2*i* or 3*f* to 3*i*). In this embodiment, the transition of the clutch position over time during a clutch engagement process at a shift down can be changed by selecting any one of the three running modes (normal mode, swift mode and gentle mode).

In this embodiment, the selected shift-down regulation map (either 1*f*, 2*f* or 3*f*) is used for drive control of the clutch actuator 63 during the period from the clutch off state to the initial clutch position shown in FIG. 12 (the period from t2 to t3), and the selected shift-down regulation map (either 1*g*, 2*g* or 3*g*) is used for drive control of the clutch actuator 63 during the period from the initial clutch position to the clutch on state (the period from t3 to t5).

Figure 13:
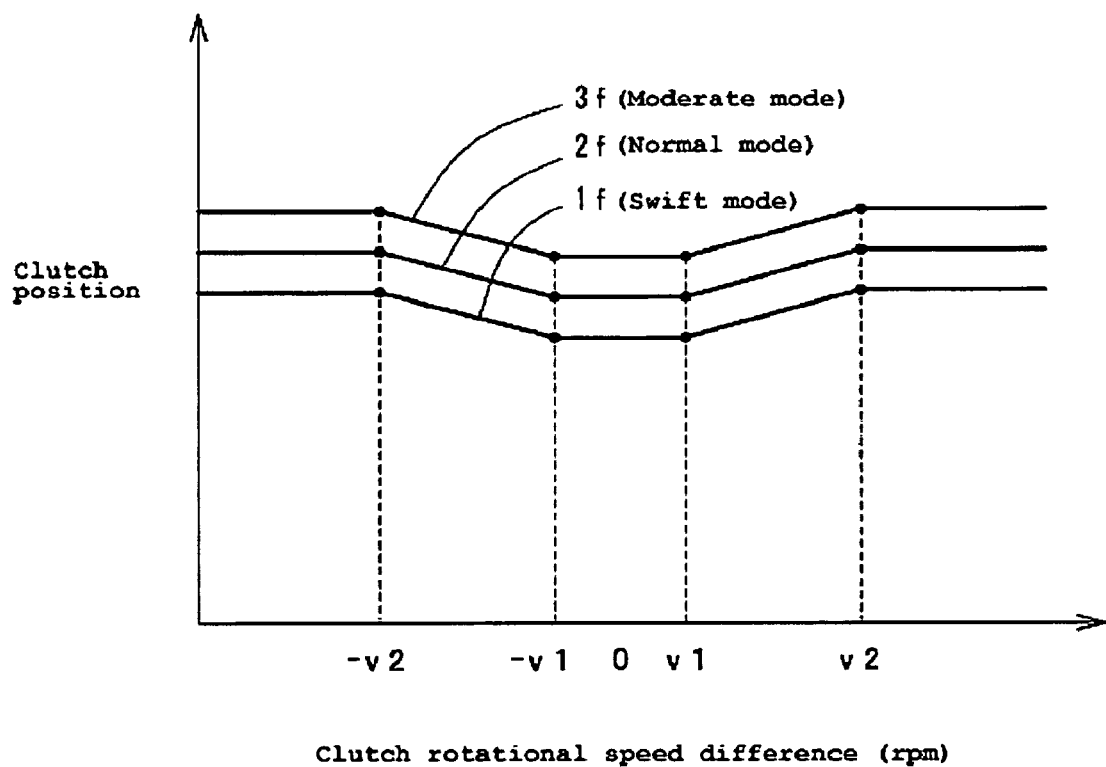
FIG. 13 shows shift-down regulation maps for the respective running modes.

FIG. 13 shows the shift-down regulation maps for the respective running modes, used during the period from the clutch off state to the initial clutch position. The shift-down regulation maps 1*f*, 2*f* and 3*f* each define the relationship between the clutch rotational speed difference and the target clutch position. The ECU 100 performs drive control of the clutch actuator 63 based on the shift-down regulation map corresponding to the selected running mode. That is, the ECU 100 performs drive control of the clutch actuator 63 such that the target clutch positions indicated by the selected shift-down regulation map are achieved at respective clutch rotational speed differences ($-v2, -v1, 0, v1$ and $v2$).

As shown in FIG. 13, the target clutch positions at the respective clutch rotational speed differences ($-v2, -v1, 0, v1$ and $v2$) indicated by the shift-down regulation map 1$f$ for the swift mode are deviated (advanced) to the clutch engaged side with respect to those indicated by the shift-down regulation map 2$f$ for the normal mode. With these characteristics, the swift mode allows swifter shift down operation in response to an operation of the shift down switch 43$b$ (see FIG. 2). Also, the target clutch positions at the respective clutch rotational speed differences indicated by the shift-down regulation map 3$f$ for the gentle mode are deviated (retarded) to the clutch disengaged side with respect to those indicated by the shift-down regulation map 2$f$ for the normal mode. With these characteristics, the gentle mode allows gentler shift up operation in response to an operation of the shift down switch 43$b$ compared to the normal mode.

Figure 14:
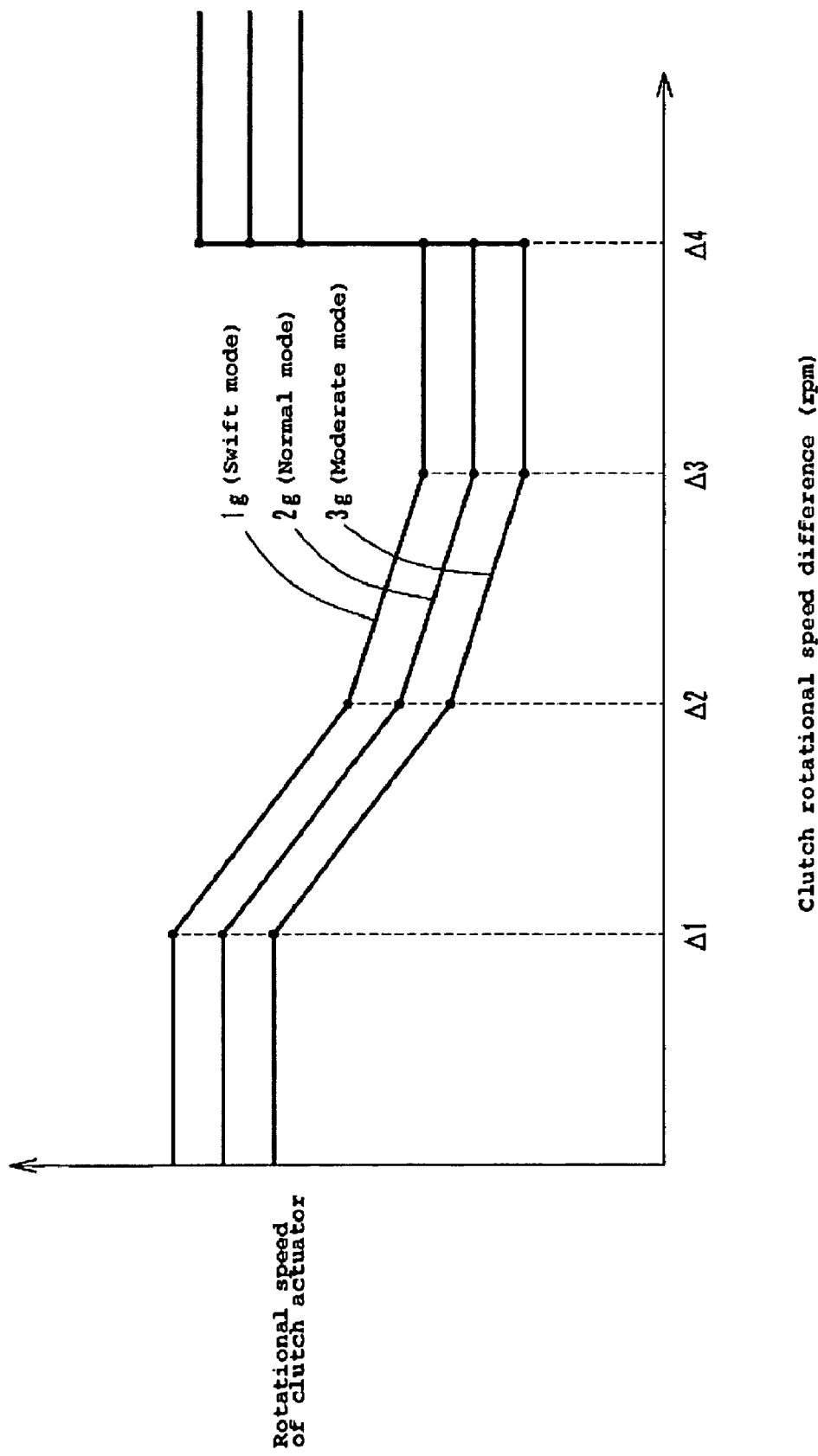
FIG. 14 shows shift-down regulation maps for the respective running modes.

FIG. 14 shows the shift-down regulation maps for the respective running modes, used during the period from the initial clutch position to the clutch on state. The shift-down regulation maps in the drawing are those for use at a shift down from the 2nd gear to the 1st gear. The shift-down regulation maps 1$g$, 2$g$ and 3$g$ each define the relationship between the clutch rotational speed difference and the rotational speed of the clutch actuator 63. The ECU 100 performs drive control of the clutch actuator 63 based on the shift-down regulation map corresponding to the selected running mode. That is, the ECU 100 performs drive control of the clutch actuator 63 such that the rotational speeds indicated by the selected shift-down regulation map are achieved at respective clutch rotational speed differences ($\Delta 1, \Delta 2$ and $\Delta 3$).

As shown in FIG. 14, the rotational speeds of the clutch actuator 63 at the respective clutch rotational speed differences ($\Delta 1, \Delta 2$ and $\Delta 3$) indicated by the shift-down regulation map 1$g$ for the swift mode are faster than those indicated by the shift-down regulation map 2$g$ for the normal mode. With these characteristics, the swift mode allows swifter shift down operation compared to the normal mode. Also, the rotational speeds of the clutch actuator 63 at the respective clutch rotational speed differences indicated by the shift-down regulation map 3$g$ for the gentle mode are slower than those indicated by the shift-down regulation map 2$g$ for the normal mode. With these characteristics, the gentle mode allows gentler shift down operation compared to the normal mode.

As described using FIGS. 7 to 14, in the two-wheeled motor vehicle 10 according to this embodiment, the target clutch position can be changed by human manipulation by selecting any one of the three running modes and, as a result, the engagement behavior of the clutch 54 can be changed among the three settings. More specifically, when the swift mode is selected, swifter responses can be obtained at vehicle start-up, at a shift up and at a shift down, as compared to the normal mode. Also, when the gentle mode is selected, gentler responses can be obtained at vehicle start-up, at a shift up and at a shift down, as compared to the normal mode. In this embodiment, response at vehicle start-up, at a shift up and at a shift down is not changed by changing the throttle opening according to an accelerator input, but by changing the target clutch position. That is, response control is independent of throttle control in this embodiment.

As has been described above, in order to perform swift starting operation, shift up operation and shift down operation of the two-wheeled motor vehicle 10 according to this embodiment, the swift mode is selected to regulate the target clutch position based on the regulation maps 1$a$ to 1$i$ for the swift mode. Also, in order to perform gentle starting operation, shift up operation and shift down operation, the gentle mode is selected to regulate the target clutch position based on the regulation maps 3$a$ to 3$i$ for the gentle mode. In this way, starting operation, shift up operation and shift down operation of the two-wheeled motor vehicle 10 can be adjusted so as to obtain a responsiveness corresponding to the user's desire regarding the vehicle's driving characteristic (e.g., however fast it response at start-up).

Post-assembly adjustment of response also can be easily performed by human manipulation in this embodiment. Therefore, in case individual differences occur in the response of the two-wheel motor vehicle 10 in the manufacturing process or the like, the driving behavior of the clutch actuator 63 can be changed to cancel such individual differences. In other words, the clutch behavior can be adjusted into accordance with specifications by changing the target position in the control system rather than mechanically adjusting the clutch components. In this manner, the present clutch control device provides an easy means for compensating for the stack-up of manufacturing tolerances in the clutch components.

In the embodiment described above, the EEPROM 94 stores regulation maps corresponding to the respective running modes. Alternatively, the EEPROM 94 (see FIG. 3) may store regulation maps for one running mode, which are overwritten with regulation maps corresponding to another running mode when the running mode is changed. For example, the EEPROM 94 may store the regulation maps 2$a$ to 2$i$ for the normal mode by default, and may overwrite the default regulation maps with the regulation maps 1$a$ to 1$i$ for the swift mode at a change to the swift mode, or with the regulation maps 3$a$ to 3$i$ for the gentle mode at a change to the gentle mode. Also with this configuration, the responsiveness of the clutch can be tailed to coincide with user intentions, as in the case of the two-wheeled motor vehicle 10 according to this embodiment.

Another configuration is also possible, in which, for example, the EEPROM 94 stores regulation maps for one running mode while the ROM 91 (see FIG. 3) of the main microcomputer 90 or the like stores a specific correction program, so that the regulation maps are subjected to a correction computation process in response to a running mode change command. For example, in response to a change command from the normal mode to the swift mode, the regulation maps 2$a$ to 2$i$ for the normal mode stored in the EEPROM 94 may be subjected to a correction computation process based on the above correction program, so that the regulation maps 1$a$ to 1$i$ for the swift mode can be obtained and/or adjusted. The EEPROM 94 can overwrite the stored clutch positions with the adjusted positions or the adjustments to the stored positions can be calculated and used for each operation of the clutch actuator without saving the adjusted values. In this manner, the responsiveness of the clutch can also be easily tailored to coincide with the user's desires.

Moreover, as shown in FIGS. 8, 10, 11, 13 and 14, the target clutch position (or the rotational speed of the clutch actuator 63, which uniquely corresponds to the target clutch position) is uniformly changed through the respective engine rotational speeds ($n2$ to $n4$) or the respective rotational speed differences ($-v2$ to $v2$, $\Delta 1$ to $\Delta 3$) in the regulation maps for the respective running modes. Therefore, the above correction program may be a simple correction computation program based on addition, subtraction and remainder calculation, rather than a complicated correction computation program. In the present clutch control device, the target clutch position (or the rotational speed of the clutch actuator 63) is not necessarily corrected in stages (in the above-described example, three stages) as described above, but may be continuously corrected.

Although this invention has been disclosed in the context of a certain preferred embodiments and examples, it will be understood by those skilled in the art that the present invention extends beyond the specifically disclosed embodiments to other alternative embodiments and/or uses of the invention and obvious modifications and equivalents thereof. In addition, while a number of variations of the invention have been shown and described in detail, other modifications, which are within the scope of this invention, will be readily apparent to those of skill in the art based upon this disclosure. It is also contemplated that various combinations or subcombinations of the specific features and aspects of the embodiments may be made and still fall within the scope of the invention. Accordingly, it should be understood that various features and aspects of the disclosed embodiments can be combine with or substituted for one another in order to form varying modes of the disclosed invention. Thus, it is intended that the scope of the present invention herein disclosed should not be limited by the particular disclosed embodiments described above, but should be determined only by a fair reading of the claims.

What is claimed is:

1. An automatic clutch device comprising:
   a clutch control device;
   an automatic wet multiple plate friction clutch interposed between a driving-side power transmission mechanism and a driven-side power transmission mechanism; and
   an electric actuator arranged to engage and disengage the automatic wet multiple plate friction clutch directly or indirectly; wherein
   the clutch control device includes:
      a driving-side rotational speed detection device configured to detect a driving-side rotational speed, which is a rotational speed of a driving part of the automatic wet multiple plate friction clutch or the driving-side power transmission mechanism;
      a clutch position detection device configured to detect a position of the automatic wet multiple plate friction clutch;
      a storage device configured to store a target position of the automatic wet multiple plate friction clutch set in association with the driving-side rotational speed;
      a drive control unit configured to receive a detected value of the driving-side rotational speed from the driving-side rotational speed detection device and to perform drive control of the automatic wet multiple plate friction clutch based on the target position of the automatic wet multiple plate friction clutch corresponding to the detected value stored in the storage device and the detected position of the automatic wet multiple plate friction clutch; and
      a clutch position change device configured to change the target position according to human manipulation.

2. The automatic clutch device according to claim 1, wherein:
   the storage device is configured to store a plurality of types of regulation maps to regulate the target position of the automatic wet multiple plate friction clutch;
   the clutch position change device changes the target position based on one or more regulation maps selected from the plural types of regulation maps according to human manipulation.

3. The automatic clutch device according to claim 2, wherein the regulation map regulates a relationship between the driving-side rotational speed and the target position of the automatic wet multiple plate friction clutch.

4. The automatic clutch device according to claim 2, wherein:
   the driving-side power transmission mechanism includes an engine; and
   the regulation map regulates a relationship between an engine rotational speed and the target position of the automatic wet multiple plate friction clutch at a time of vehicle start-up.

5. The automatic clutch device according to claim 2, further comprising:
   a driven-side rotational speed detection device arranged to detect a driven-side rotational speed, which is a rotational speed of a driven part of the friction automatic wet multiple plate friction clutch or the driven-side power transmission mechanism,
   wherein the regulation map regulates a relationship between a clutch rotational speed difference, which is a difference between the driving-side rotational speed and the driven-side rotational speed, and a driving speed of the actuator.

6. The automatic clutch device according to claim 5, wherein:
   the clutch control device is mounted on a vehicle provided with a gearbox; and
   the regulation map regulates a relationship between the clutch rotational speed difference and the driving speed of the actuator at a time of a shift up or a shift down.

7. The automatic clutch device according to claim 2, further comprising:
   a driven-side rotational speed detection device arranged to detect a driven-side rotational speed, which is a rotational speed of a driven part of the automatic wet multiple plate friction clutch or the driven-side power transmission mechanism,
   wherein the regulation map regulates a relationship between a clutch rotational speed difference, which is a difference between the driving-side rotational speed and the driven-side rotational speed, and the target position of the automatic wet multiple plate friction clutch.

8. The automatic clutch device according to claim 7, wherein:
   the clutch control device is mounted on a vehicle provided with a gearbox; and
   the regulation map regulates a relationship between the clutch rotational speed difference and the target position of the automatic wet multiple plate friction clutch at a time of a shift up or a shift down.

9. The automatic clutch device according to claim 1, wherein:
   the storage device is a map storage device configured to store a regulation map to regulate the target position of the automatic wet multiple plate friction clutch; and
   the clutch position change device being configured to perform a specific correction computation process on the regulation map, and thereby changing the target position based on the corrected regulation map obtained through the correction computation process.

10. The automatic clutch device according to claim 9, wherein the regulation map defines a regulated relationship between the driving-side rotational speed and the target position of the automatic wet multiple plate friction clutch.

11. The automatic clutch device according to claim 9, wherein:
the driving-side power transmission mechanism includes an engine; and
the regulation map regulates a relationship between an engine rotational speed and the target position of the automatic wet multiple plate friction clutch at a time of vehicle start-up.

12. The automatic clutch device according to claim 1, wherein:
the storage device is a map storage device configured to store a regulation map to regulate the target position of the automatic wet multiple plate friction clutch; and
the map storage device is configured to overwrite a stored regulation map.

13. The automatic clutch device according to claim 12, wherein the regulation map defines a regulating relationship between the driving-side rotational speed and the target position of the automatic wet multiple plate friction clutch.

14. The automatic clutch device according to claim 12, wherein:
the driving-side power transmission mechanism includes an engine; and
the regulation map regulates a relationship between an engine rotational speed and the target position of the automatic wet multiple plate friction clutch at a time of vehicle start-up.

15. A vehicle comprising:
an automatic clutch device including a wet multiple plate friction clutch interposed between a driving-side power transmission mechanism and a driven-side power transmission mechanism;
an electric actuator arranged to engage and disengage the automatic wet multiple plate friction clutch directly or indirectly; and
a clutch control device including:
a driving-side rotational speed detection device configured to detect a driving-side rotational speed, which is a rotational speed of a driving part of the automatic wet multiple plate friction clutch or the driving-side power transmission mechanism,
a clutch position detection device configured to detect a position of the automatic wet multiple plate friction clutch,
a storage device configured to store a target position of the automatic wet multiple plate friction clutch set in association with the driving-side rotational speed,
a drive control unit configured to receive a detected value of the driving-side rotational speed from the driving-side rotational speed detection device to perform drive control of the automatic wet multiple plate friction clutch based on the target position of the automatic wet multiple plate friction clutch corresponding to the detected value stored in the storage device and the detected position of the automatic wet multiple plate friction clutch, and
a clutch position change device configured to change the target position according to human manipulation.

16. The vehicle according to claim 15, wherein the automatic clutch device is a hydraulic automatic clutch device.

17. The vehicle according to claim 15, wherein the actuator is an electric motor.

18. The vehicle according to claim 15, wherein the clutch position change device comprises a switch disposed on a handlebar of the vehicle.

* * * * *